United States Patent
Wang et al.

(10) Patent No.: US 7,781,921 B2
(45) Date of Patent: Aug. 24, 2010

(54) VOLTAGE REGULATOR AND METHOD FOR GENERATING INDICATOR SIGNAL IN VOLTAGE REGULATOR

(75) Inventors: Chien-Hui Wang, Hsinchu (TW);
Jian-Rong Huang, Hsinchu (TW);
Kuo-Lung Tseng, Longtan (TW);
Liang-Pin Tai, Shalun (TW)

(73) Assignee: Richtek Technology Corporation, Hsin-Chu (TW)

( * ) Notice: Subject to any disclaimer, the term of this patent is extended or adjusted under 35 U.S.C. 154(b) by 78 days.

(21) Appl. No.: 12/287,363

(22) Filed: Oct. 8, 2008

(65) Prior Publication Data
US 2009/0102448 A1    Apr. 23, 2009

(30) Foreign Application Priority Data
Oct. 23, 2007    (TW)    ............... 96139719 A

(51) Int. Cl.
*G01R 1/20*    (2006.01)
*G06F 1/00*    (2006.01)

(52) U.S. Cl. ..................................... 307/154; 713/323
(58) Field of Classification Search ............. 713/323.3; 323/224; 307/154
See application file for complete search history.

(56) References Cited
U.S. PATENT DOCUMENTS
7,512,821 B2 *    3/2009    Ueda ......................... 713/323

* cited by examiner

*Primary Examiner*—Shawn Riley
(74) *Attorney, Agent, or Firm*—Tung & Associates

(57) ABSTRACT

The subject matter is a voltage regulator capable of providing an indicator signal to a load, so that the load can operation under the best current-voltage relationship according to the indicator signal. To this end, the voltage regulator includes an amplifier for generating the indicator signal by amplifying a difference between a signal representative of an output voltage and a signal representative of a reference voltage.

8 Claims, 4 Drawing Sheets

VOLTAGE REGULATOR AND METHOD FOR GENERATING INDICATOR SIGNAL IN VOLTAGE REGULATOR

BACKGROUND OF THE INVENTION

1. Field of Invention

The present invention relates to a voltage regulator, in particular to a voltage regular capable of providing an indicator signal to a load, and a corresponding method.

2. Description of Related Art

It is sometimes required for a voltage regulator to provide an indicator signal to its load. For example, when the load is a certain kind of central processor unit (CPU), the voltage regulator may need to provide power information so that the CPU can operate under the best current-voltage relationship, and adjust its operational frequency accordingly.

More specifically, referring to FIG. 1, it is required in the specification of some CPU that the supply voltage must decrease in correspondence with the increase of the load current. The corresponding current-voltage relationship is shown in FIG. 2, wherein the solid line represents the desired relationship with a slope $R_{LL}$ (decided by the specification), and the dash lines represents the tolerable error range.

To meet this requirement, the voltage regulator needs to obtain current information from outside of the circuit, to feedback such information into the circuit to control its output voltage. Referring to FIG. 3, the voltage regulator 10 includes an error amplifier 12, a voltage regulator module (VRM) 14, and driver gates 16 and 18. The output voltage Vout (or a dividend voltage thereof), after voltage drop, is compared with a reference voltage Vref, and the result is input to the VRM 14 to generate up-gate and low-gate control signals, which control the operations of the up-gate and low-gate transistors Q1 and Q2, respectively. In addition, the VRM 14 further obtains load current information from outside of the circuit, typically by sensing the current flowing through the inductor L. Thus, the VRM 14 controls the output voltage Vout according to the load current information, the current-voltage relationship in FIG. 2, and the comparison made by the error amplifier 12, so that a desired output voltage Vout is generated. The resistor Rdcr represents the parasitic resistance of the inductor L, and a typical way to sense the current on the inductor L is to detect the voltage across this resistor Rdcr; the detected voltage signal can be used to represent the load current information. FIG. 4 shows a typical method to detect the voltage across the resistor Rdcr. A resistor and a capacitor connected in series are connected with the inductor L in parallel; the voltage across the capacitor is converted to current by a transconductor 15, which is the desired load current information.

However, because the parasitic resistor Rdcr of the inductor L has positive temperature coefficient (PTC), the load current information generated according to the voltage across the resistor Rdcr will be inaccurate outside a certain temperature range. Hence, as shown in FIG. 3, the circuit must somewhere include a resistor having negative temperature coefficient (NTC) to compensate the temperature effect of the load current information to the VRM 14, which may be the resistor Rntc1 located in the position as shown, so that the output of the error amplifier 12 carries negative temperature coefficient, and the total effect is compensated in the VRM 14.

As stated above, in addition to generating the desired output voltage Vout, the voltage regulator 10 also has to provide power information (the product of load current and output voltage). However, the current information obtained from the voltage across the resistor Rdcr is inaccurate, so an NTC resistor Rntc2 is required to compensate the temperature effect on the current information, as shown in FIG. 4. The current information after compensating temperature effect can then be used to calculate power.

The above mentioned prior art is disadvantageous in that additional NTC resistors in such prior art increase the cost (even higher cost for PTC resistors). Moreover, if the load requires a multiple phase voltage regulator, undesirably, corresponding number of additional NTC (or PTC) resistors are required.

In view of the foregoing drawbacks in the prior art, it is desired to provide a voltage regulator capable of providing an indicator signal to its load, without using costly devices.

SUMMARY OF THE INVENTION

In view of the foregoing, it is a first objective of the present invention to provide a voltage regular capable of generating an indicator signal, to solve the problem in the prior art. The indicator signal may be, e.g., power information (the product of load current and output voltage), load current information, and/or output voltage information.

A second objective of the present invention is to provide a method for generating an indicator signal.

In accordance with the foregoing and other objectives of the present invention, in one aspect, the present invention provides a voltage regulator which generates a control signal to convert an input voltage to an output voltage, the voltage regulator comprising: a regulator module for generating the control signal according to comparison between a signal representative of the output voltage and a signal representative of a reference voltage; and an amplifier for generating a first index signal by amplifying a difference between the signal representative of the output voltage and the signal representative of the reference voltage.

Preferably, the amplifier includes: an operational amplifier having one input electrically connected with the signal representative of the reference voltage, and another input electrically connected with the signal representative of the output voltage via a first resistor; a transistor having a gate controlled by the output of the operational amplifier; a current mirror mirroring the current passing through the transistor in proportion unto a path; and a second resistor on the path.

From another aspect, the present invention provides a method for generating an indicator signal in a voltage regulator, comprising the steps of: providing a voltage regulator which generates a control signal to convert an input voltage to an output voltage; and amplifying a difference between a signal representative of the output voltage and a signal representative of a reference voltage, to generate a first indicator signal.

It is to be understood that both the foregoing general description and the following detailed description are provided as examples, for illustration but not for limiting the scope of the invention.

BRIEF DESCRIPTION OF THE DRAWINGS

These and other features, aspects, and advantages of the present invention will become better understood with regard to the following description, appended claims, and accompanying drawings.

DESCRIPTION OF THE PREFERRED EMBODIMENTS

In the present invention, power information or other information can be generated without additional NTC/PTC resistors. Referring to the schematic diagram of FIG. 5, the voltage regulator 20 in this embodiment includes a K-fold operational amplifier 13, having two inputs receiving the output voltage Vout (or a ratio of the output voltage Vout) and a reference voltage Vref, respectively, and generates an output of K fold of the difference between the two signals.

Figure 1:
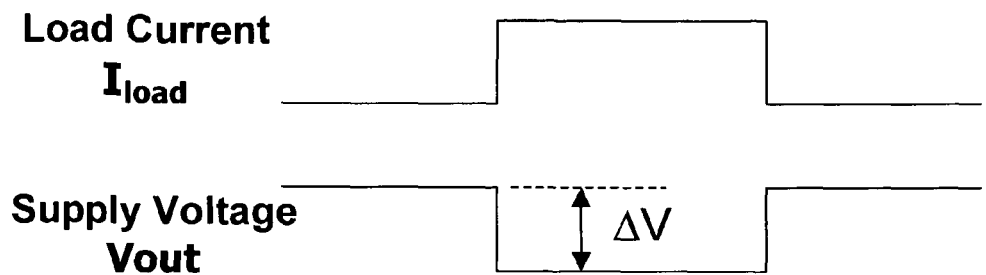
FIG. 1 shows the relationship between load current and supply voltage, as required by certain processors.
Figure 2:
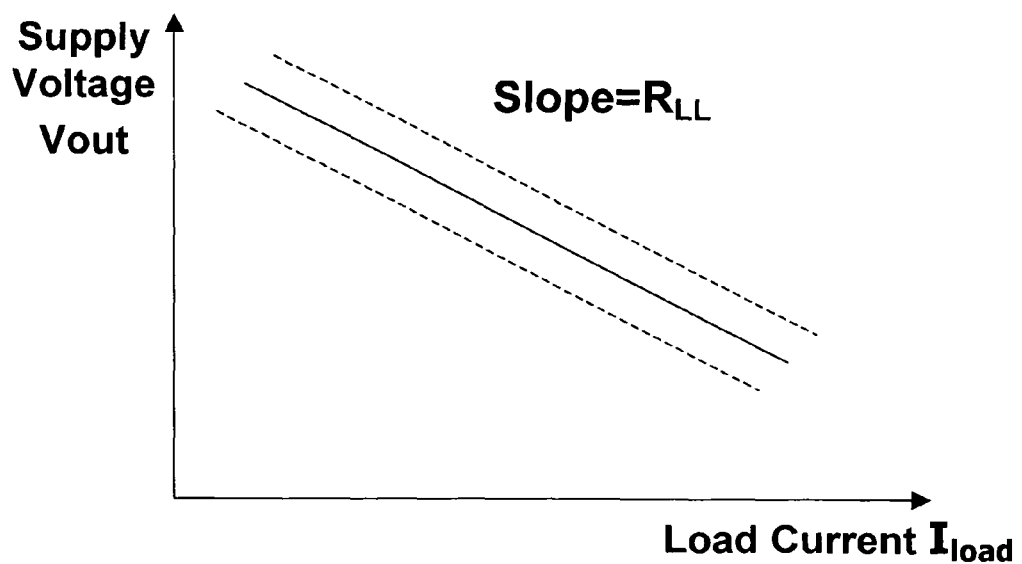
FIG. 2 shows the relationship between current and voltage.
Figure 3:
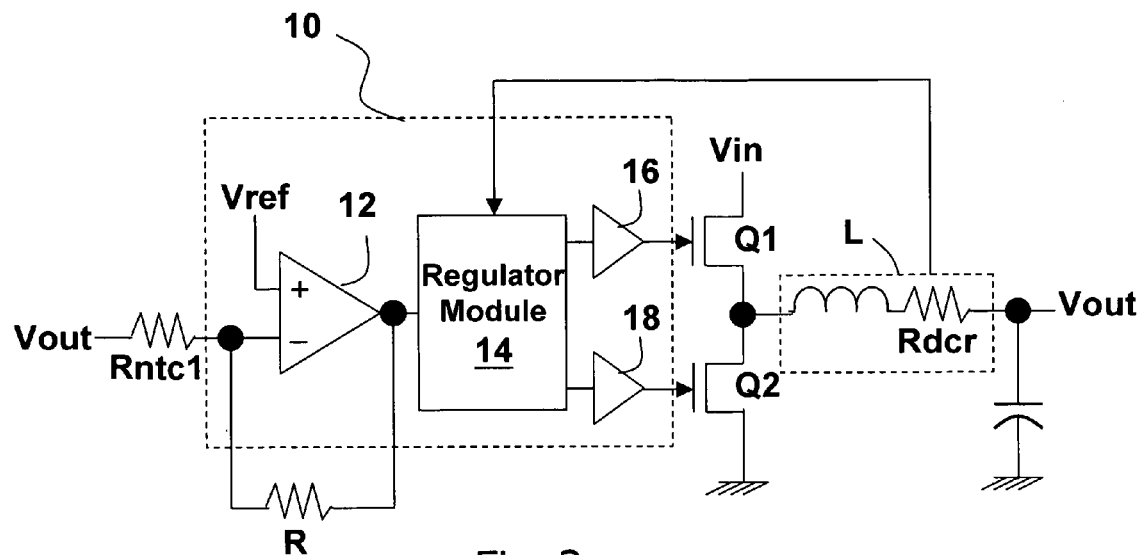
FIG. 3 shows a conventional circuit.
Figure 4:
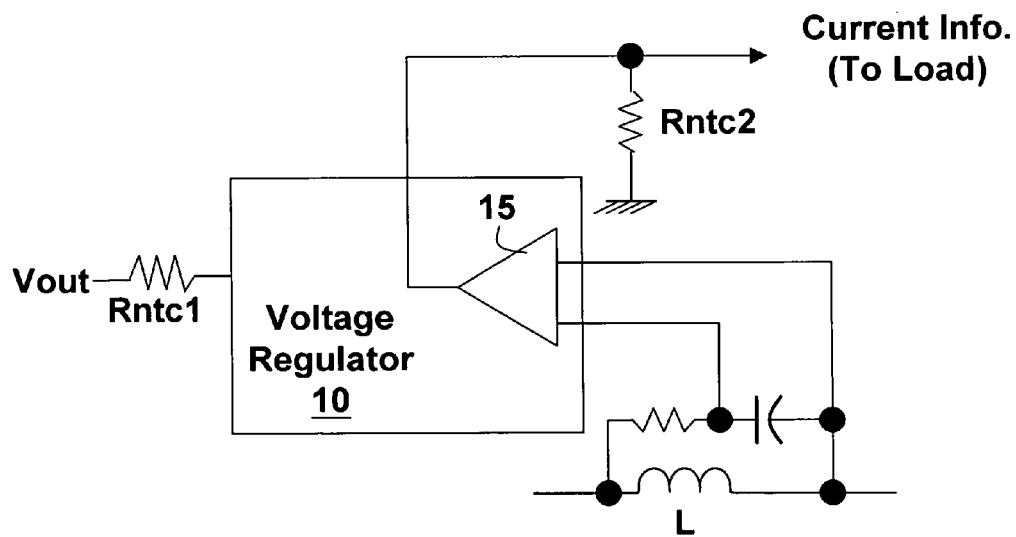
FIG. 4 shows more details of the regulator module in the conventional circuit.
Figure 5:
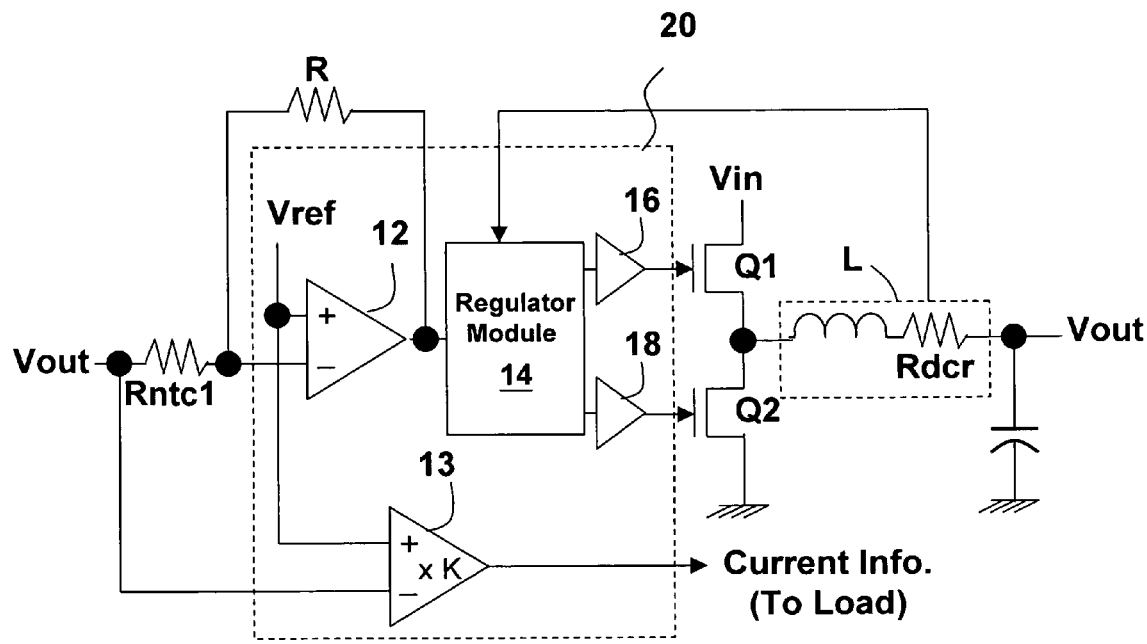
FIG. 5 is a schematic circuit diagram showing a first embodiment of the present invention.

Referring to FIGS. 5, 1 and 2, let the output voltage be Vout, the load current be $I_{load}$, the slope be $R_{LL}$, then $$Vout = I_{load} \times R_{LL}, \text{ and } \Delta V = I_{load} \times R_{LL}$$

wherein ΔV is the difference between the reference voltage Vref and the output voltage Vout. Thus, by properly assigning the factor K to the operational amplifier 13, the output of the operational amplifier 13 can represent the current information (multiplied by a certain constant).

Figure 6:
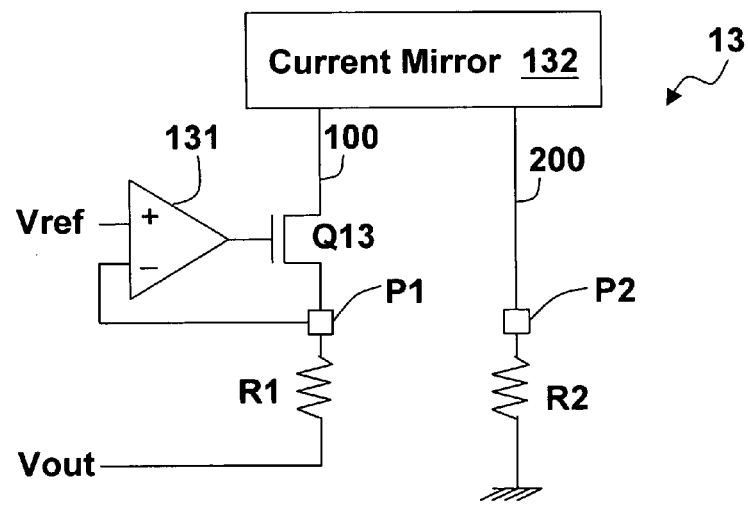
FIG. 6 shows an example of the circuit structure of the K-fold operational amplifier.

The K-fold operational amplifier 13 can be embodied in various ways. FIG. 6 shows one example: by feedback mechanism achieved by the operational amplifier 131 and the transistor Q13, the voltage at the node P1 is balanced at the level of the reference voltage Vref, and the current mirror 132 mirrors the current on the path 100 unto the path 200. Thus, the voltage at the node P2 equals to (Vref−Vout)×R2/R1, and K=R2/R1. This embodiment has the advantage that the value K is easily adjustable by changing the resistors R1 and R2; to adjust K is to adjust $R_{LL}$.

The dash line in FIG. 5 shows that the voltage regulator 20 is an integrated circuit, and that the K-fold operational amplifier 13 is located inside the integrated circuit. However, this is not the only way to embody the present invention. The voltage regulator 20 does not have to be a single integrated circuit, and the K-fold operational amplifier 13 does not have to be completely located inside the integrated circuit. For example, if it is desired to adjust the value $R_{LL}$ from outside the integrated circuit, the resistors R1 and R2 can be located outside the integrated circuit, and in this case the nodes P1 and P2 may be the pins of the integrated circuit.

Figure 7:
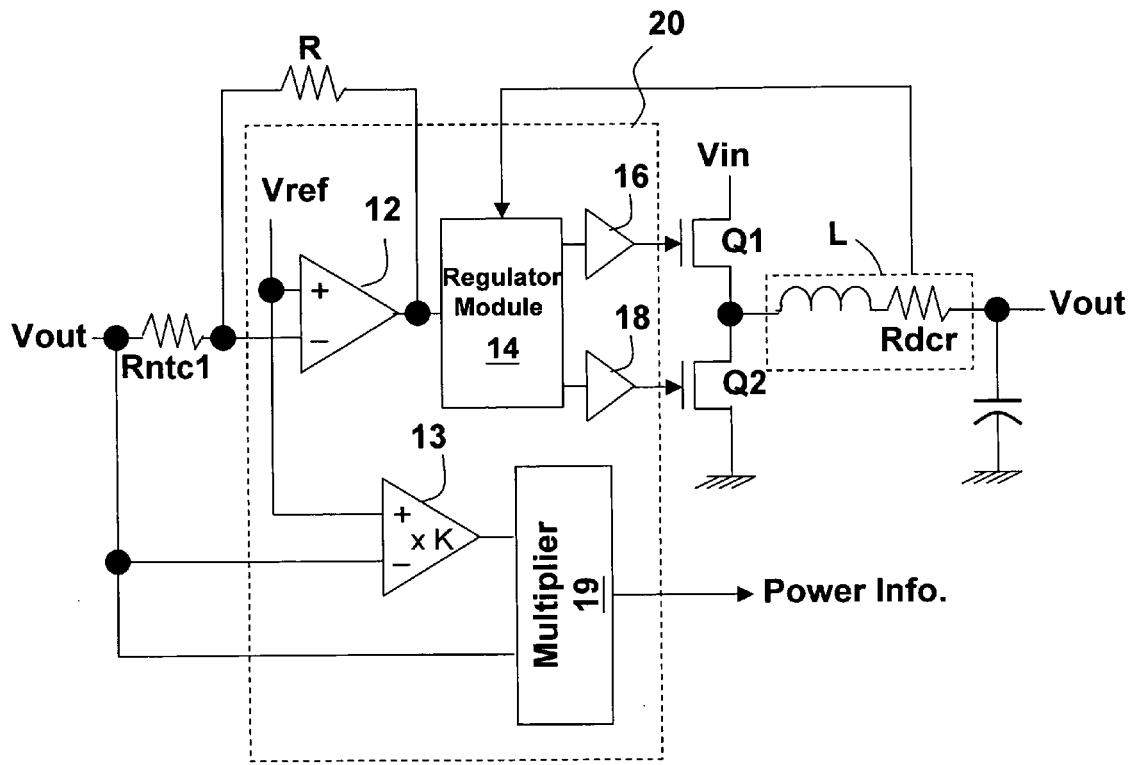
FIG. 7 is a schematic circuit diagram showing another embodiment of the present invention.

FIG. 7 shows another embodiment of the present invention, which further includes a multiplier 19 that multiplies the load current information with the output voltage information, so that the circuit can output power information directly. The rest of the circuit is similar to the embodiment of the FIG. 5, so the details thereof are not redundantly repeated here.

In comparison with the prior art, the resistors R1 and R2 in the present invention do not need to be NTC/PTC resistors; the current information or power information obtained by the circuit is not affected by temperature, so the present invention is better.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a buck switching regulator is shown in the embodiments as an example of the voltage regulator, but the present invention can be applied to other types of voltage regulators, such as linear regulator, boost switching regulator, buck-boost switching regulator, and inverter regulator. As another example, a K-fold amplifier as shown in FIG. 6 is not the only way to amplify the difference between the reference voltage Vref and the output voltage Vout. In view of the foregoing, it is intended that the present invention cover all such and other modifications and variations, which should be interpreted to fall within the scope of the following claims and their equivalents.

What is claimed is:

1. A voltage regulator which generates a control signal to convert an input voltage to an output voltage so as to provide an output current, the voltage regulator comprising:
   a regulator module for generating the control signal according to comparison between a signal representative of the output voltage and a signal representative of a reference voltage; and
   an amplifier for amplifying a difference between the signal representative of the output voltage and the signal representative of the reference voltage to generate a current indicator signal indicating the amount of the output current.

2. The voltage regulator of claim 1, further comprising a multiplier which multiplies the current indicator signal with the signal representative of the output voltage to generate a power indicator signal.

3. The voltage regulator of claim 1, wherein the output voltage is supplied to a load circuit, and the amplifying factor of the amplifier is decided by the specification of this load circuit.

4. The voltage regulator of claim 1, wherein the amplifier includes:
   an operational amplifier having one input electrically connected with the signal representative of the reference voltage, and another input electrically connected with the signal representative of the output voltage via a first resistor;
   a transistor having a gate controlled by the output of the operational amplifier;
   a current mirror mirroring the current passing through the transistor in proportion unto a path; and
   a second resistor on the path.

5. The voltage regulator of claim 4, wherein the regulator module, the operational amplifier, the transistor and the current mirror are integrated in an integrated circuit, and the first and second resistors are located outside the integrated circuit.

6. The voltage regulator of claim 4, wherein the output voltage is supplied to a load circuit, and a resistance ratio between the second resistor and the first resistor is decided by the specification of this load circuit.

7. A method for generating an indicator signal in a voltage regulator, comprising the steps of:
   providing a voltage regulator which generates a control signal to convert an input voltage to an output voltage so as to provide an output current; and
   amplifying a difference between a signal representative of the output voltage and a signal representative of a reference voltage, to generate a current indicator signal indicating the amount of the output current.

8. The method of claim 7, further comprising: multiplying the current indicator signal with the signal representative of the output voltage to generate a power indicator signal.

* * * * *